(12) United States Patent
Wang et al.

(10) Patent No.: US 12,449,046 B2
(45) Date of Patent: Oct. 21, 2025

(54) FLUID CONTROL VALVE

(71) Applicant: ZHEJIANG SANHUA AUTOMOTIVE COMPONENTS CO., LTD., Zhejiang (CN)

(72) Inventors: Lixin Wang, Zhejiang (CN); Yun Wang, Zhejiang (CN); Long Lin, Zhejiang (CN); Jianhua Chi, Zhejiang (CN)

(73) Assignee: ZHEJIANG SANHUA AUTOMOTIVE COMPONENTS CO., LTD., Zhejiang (CN)

( * ) Notice: Subject to any disclaimer, the term of this patent is extended or adjusted under 35 U.S.C. 154(b) by 10 days.

(21) Appl. No.: 18/269,724

(22) PCT Filed: Dec. 30, 2021

(86) PCT No.: PCT/CN2021/142871
§ 371 (c)(1),
(2) Date: Jun. 26, 2023

(87) PCT Pub. No.: WO2022/143866
PCT Pub. Date: Jul. 7, 2022

(65) Prior Publication Data
US 2024/0060569 A1  Feb. 22, 2024

(30) Foreign Application Priority Data
Dec. 31, 2020 (CN) .......................... 202011625553.8

(51) Int. Cl.
*F16K 11/08* (2006.01)
*F16K 11/085* (2006.01)
*F16K 27/06* (2006.01)

(52) U.S. Cl.
CPC ........ *F16K 11/0853* (2013.01); *F16K 27/065* (2013.01)

(58) Field of Classification Search
CPC ... F16K 11/0853; F16K 11/085; F16K 27/065
See application file for complete search history.

(56) References Cited

U.S. PATENT DOCUMENTS

| 7,395,769 B2 * | 7/2008 | Jensen | ................ A01C 21/005 |
| | | | 701/50 |
| 9,665,099 B1 | 5/2017 | Saunders et al. | |

(Continued)

FOREIGN PATENT DOCUMENTS

| CN | 2435590 Y | 6/2001 |
| CN | 104455556 B | 8/2017 |

(Continued)

OTHER PUBLICATIONS

International Search Report for PCT/CN2021/142871 mailed Mar. 23, 2022, ISA/CN.

(Continued)

*Primary Examiner* — Kelsey E Cary
(74) *Attorney, Agent, or Firm* — Yue (Robert) Xu; Apex Attorneys at Law, LLP

(57) ABSTRACT

A fluid control valve is disclosed, comprising a driving assembly, a valve core assembly, and a main valve body. The valve core assembly can be driven by the driving assembly to rotate; the main valve body is provided with a valve body part and at least two adapter parts; each adapter part extends radially outwards from a side wall of the valve body part, the adapter part is provided with an adapter channel, and the adapter part further has an adapter port corresponding to and communicated with the adapter channel; an opening of the adapter port of each adapter part faces a side of the adapter part facing away from the driving assembly.

19 Claims, 5 Drawing Sheets

(56) References Cited

U.S. PATENT DOCUMENTS

| | | | |
|---|---|---|---|
| 2005/0051212 A1 | 3/2005 | Huber et al. | |
| 2007/0068584 A1* | 3/2007 | Murdock | F16K 11/0873 137/625.47 |
| 2010/0319796 A1* | 12/2010 | Whitaker | F16K 11/085 137/625.46 |
| 2014/0090414 A1 | 4/2014 | McLane et al. | |
| 2014/0311598 A1* | 10/2014 | Hui | F16K 11/0853 137/556.6 |
| 2020/0011437 A1 | 1/2020 | Lin et al. | |
| 2020/0353811 A1 | 11/2020 | Wolf et al. | |
| 2023/0213108 A1 | 7/2023 | Lin | |

FOREIGN PATENT DOCUMENTS

| | | |
|---|---|---|
| CN | 207111998 U | 3/2018 |
| CN | 109424765 A | 3/2019 |
| CN | 109424766 A | 3/2019 |
| CN | 110529628 A | 12/2019 |
| CN | 111379863 A | 7/2020 |
| EP | 3550189 A1 | 10/2019 |
| JP | H07224955 A | 8/1995 |
| JP | H0828727 A | 2/1996 |
| JP | 3286468 B2 | 5/2002 |
| WO | 2018069875 A1 | 4/2018 |
| WO | 2021243721 A1 | 12/2021 |

OTHER PUBLICATIONS

First Office Action dated Feb. 20, 2024 for Japanese patent application No. 2023-540223, English translation provided by Global Dossier.

European Search Report issued on Oct. 28, 2024 for the European counterpart application No. 21914597.6.

* cited by examiner

FLUID CONTROL VALVE

This disclosure is a national phase application of PCT international patent application PCT/CN2021/142871, filed on Dec. 30, 2021 which claims the benefit of the priority to Chinese Patent Application No. 202011625553.8, titled "FLUID CONTROL VALVE", filed with the China National Intellectual Property Administration on Dec. 31, 2020, which are incorporated herein by reference in its entirety.

FIELD

The present disclosure relates to the technical field of fluid control, and in particular to a fluid control valve.

BACKGROUND

In the existing systems, a control valve is required for fluid switching among multiple passages. For example, a motor vehicle may be provided with multiple control valves for control. In a fluid control valve, in order to prevent an inlet and an outlet from interfering with each other, the inlet and the outlet are located at different sides of a valve body, and the inlet and the outlet are in communication with other components in the system through pipelines. Since the inlet and the outlet are located at different sides of the valve body, the connection and mounting of the pipeline may be more complex during the mounting of the pipelines in the system.

SUMMARY

In order to provide a fluid control valve with adapter ports located on a same side of a main valve body for simple mounting, the technical solution of the present disclosure is provided as follows:

a fluid control valve includes a driving assembly, a valve core assembly and a main valve body, where the fluid control valve is provided with a valve chamber, the main valve body forms at least part of a wall portion of the valve chamber, at least part of the valve core assembly is located in the valve chamber, the valve core assembly is rotatable driven by the driving assembly, where the main valve body is provided with a valve body portion and at least two adapter portions, each adapter portion extends outward from a side wall of the valve body portion, each adapter portion is provided with an adapter passage, each adapter portion is further provided with an adapter port corresponding to and in communication with the adapter passage, the valve body portion is provided with at least two connection ports, the adapter passage is in communication with at least one connection port; for each adapter portion, the adapter port of the adapter portion is opened in a direction of the adapter portion opposite to the driving assembly.

By providing the adapter portions, the connection ports located on different sides of the valve body portion can be switched to be in a same opening direction, without the need of adjusting the orientation by providing and bending a connecting pipe during mounting the fluid control valve, so that the mounting of the fluid control valve is simple.

DETAILED DESCRIPTION OF THE EMBODIMENTS

Figure 1:
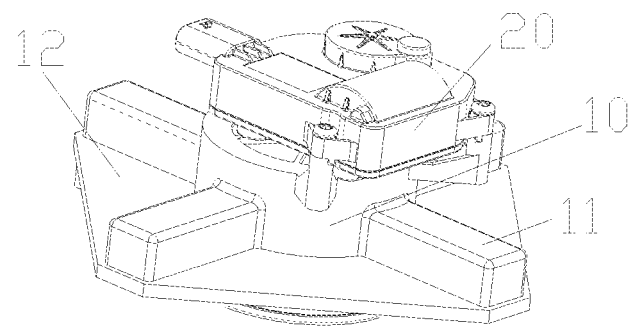
FIG. 1 is a schematic perspective view of a fluid control valve according to an embodiment.
Figure 2:
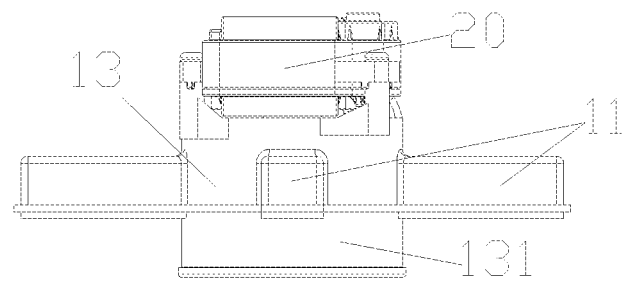
FIG. 2 is a schematic front view of the fluid control valve shown in FIG. 1.

The technical solution of the specific embodiments is described below in conjunction with the accompanying drawings. As shown in FIG. 1, a fluid control valve includes a driving assembly 20, a valve core assembly (not shown) and a main valve body 10. The fluid control valve is further provided with a valve chamber, at least part of a wall portion of the valve chamber is formed by the main valve body 10, at least most of the valve core assembly is located in the valve chamber, and the valve core assembly is rotatable driven by the driving assembly 20. By controlling the rotation of the valve core assembly, the connection relation among the connection ports can be changed.

As shown in FIG. 1 to FIG. 5, at least most of the valve core assembly 15 is located in the valve chamber, and the valve core assembly 15 is rotatable driven by the driving assembly 20. A connection passage is defined in the valve core assembly 15. When the valve core assembly 15 rotates at different angles, one connection passage can be in communication with different connection ports. If multiple connection passages are provided, multiple communication modes can be realized. In this embodiment, only four connection ports and two connection passages are taken as an example, and other number of connection ports and connection passages can be derived on this basis.

As shown in FIG. 1 to FIG. 5, the main valve body 10 is provided with a valve body portion 13, adapter portions 11 and a connecting plate portion 12. The valve body portion 13 forms at least part of the wall portion of the valve chamber. Most of the valve core assembly 15 is located in the valve chamber in the valve body portion 13. A sealing component 16 is provided between the valve core assembly 15 and the wall portion of the valve chamber, and the sealing component 16 is in a compressed state. The valve core assembly 15 is provided with a first connection passage 151 and a second connection passage 152 that are independent with each other and do not interfere with each other. The sealing component 16 is provided with multiple communication holes corresponding to the first connection passage 151 and the second connection passage 152, which are a first communication hole 161, a second communication hole 162, a third communication hole 163 and a fourth communication hole 164. The valve body portion 13 is further provided with multiple connection ports corresponding to the communication holes of the sealing component 16, which are a first connection port 132, a second connection port 133, a third connection port 134 and a fourth connection port 135.

It should be noted that the connection passage of the valve core assembly 15 can be one or more, which is not limited herein. In this embodiment, two connection passages are taken as an example for the convenience of description.

In this embodiment, the first connection port 132 corresponds to and is in communication with the first communication hole 161, the second connection port 133 corresponds to and is in communication with the second communication hole 162, the third connection port 134 corresponds to and is in communication with the third communication hole 163, and the fourth connection port 135 corresponds to and is in communication with the fourth communication hole 164. By the rotation of the valve core assembly 15, the connection passages can be in communication with different communication holes, so that two corresponding connection ports can be in communication. For example, in the state shown in FIG. 5, the first communication hole 161 is in communication with the second communication hole 162 through the first connection passage 151, and the third communication hole 163 is in communication with the fourth communication hole 164 through the second connection passage 152. Since the first connection port 132 corresponds to and is in communication with the first communication hole 161, the second connection port 133 corresponds to and is in communication with the second communication hole 162, the third connection port 134 corresponds to and is in communication with the third communication hole 163, and the fourth connection port 135 corresponds to and is in communication with the fourth communication hole 164, so that the first connection port 132 is in communication with the second connection port 133 through the first communication hole 161, the first connection passage 151 and the second communication hole 162, and the third connection port 134 is in communication with the fourth connection port 135 through the third communication hole 163, the second connection passage 152 and the fourth communication hole 164. It should be noted that other communication modes can be realized by the rotation of the valve core assembly 15, which is not described in detail herein.

Figure 3:
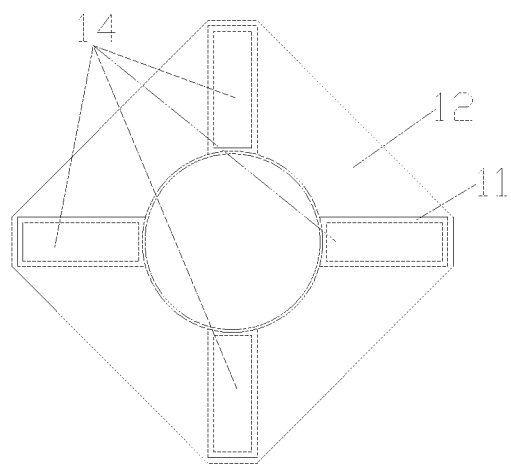
FIG. 3 is a schematic bottom view of the fluid control valve shown in FIG. 1.
Figure 4:
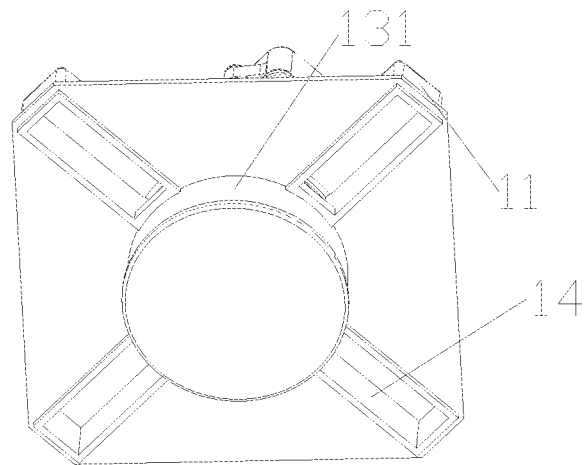
FIG. 4 is a schematic perspective view of the fluid control valve from bottom shown in FIG. 1.
Figure 5:
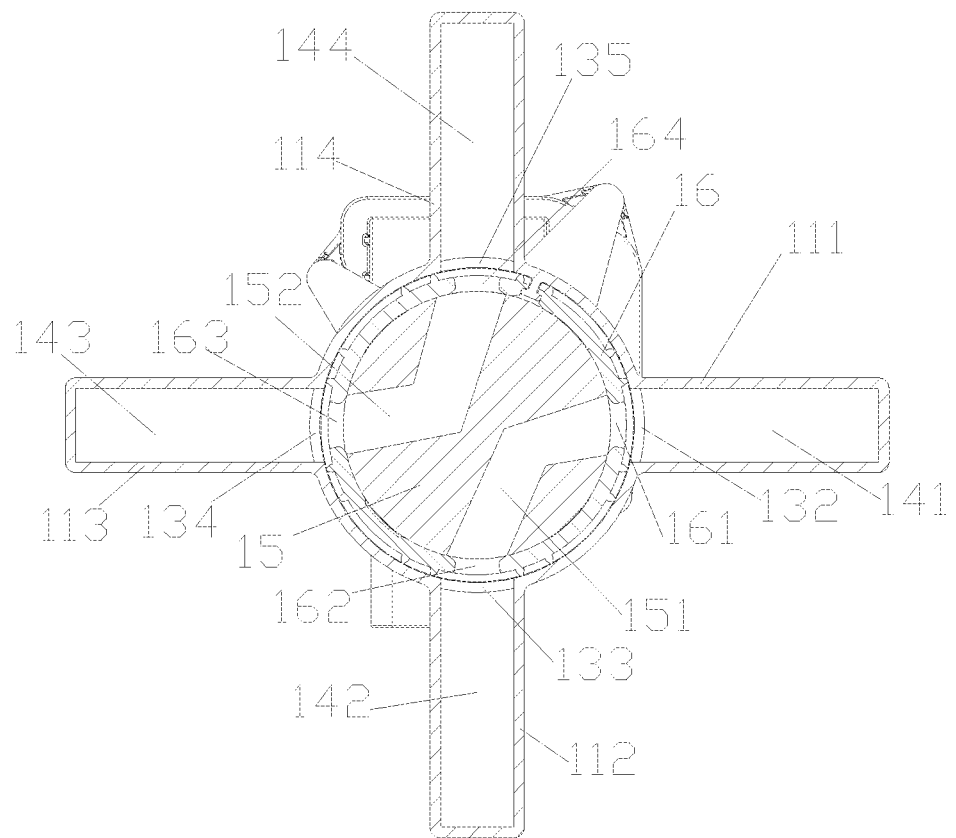
FIG. 5 is a schematic cross-sectional view of the fluid control valve shown in FIG. 1.

Each adapter portions 11 extends radially outward from a side wall of the valve body portion 13, and an adapter passage is provided in the adapter portion 11. Each adapter passage is provided with an adapter port 14, which can be used as an inlet or an outlet. As shown in FIG. 3 to FIG. 5, in this embodiment, the main valve body 10 is provided with a first adapter portion 111, a second adapter portion 112, a third adapter portion 113 and a fourth adapter portion 114. The first adapter portion 111 is provided with a first adapter passage 141, the second adapter portion 112 is provided with a second adapter passage 142, the third adapter portion 113 is provided with a third adapter passage 143, and the fourth adapter portion 114 is provided with a fourth adapter passage 144. The first adapter passage 141 corresponds to and is in communication with the first connection port 132, the second adapter passage 142 corresponds to and is in communication with the second connection port 133, the third adapter passage 14 corresponds to and is in communication with the third connection port 134, and the fourth adapter passage 144 corresponds to and is in communication with the fourth connection port 135.

In this embodiment, the adapter port of the first adapter portion 111, the adapter port of the second adapter portion 112, the adapter port of the third adapter portion 113 and the adapter port of the fourth adapter portion 114 are located on a same side of the main valve body 10, and the adapter port of the first adapter portion 111, the adapter port of the second adapter portion 112, the adapter port of the third adapter portion 113 and the adapter port of the fourth adapter portion 114 are all opened in direction, opposite to the driving assembly 20, of the respective adapter portions. For example, the adapter port of the first adapter portion 111, the adapter port of the second adapter portion 112, the adapter port of the third adapter portion 113 and the adapter port of the fourth adapter portion 114 are opened in an axial direction of the valve body portion 13 opposite to the driving assembly 20. It should be noted that the direction opposite to the driving assembly 20 generally refers to a certain side of the driving assembly 20, and does not limit the opening direction to be the same as a vertical direction of the driving assembly 20.

By providing the adapter portions 11, multiple radial connection ports located at different sides of the valve body portion 13 can be switched to be opened in a same direction, without providing and bending a connecting pipe to adjust the opening orientation of the ports located at different sides of the valve body portion 13, which is beneficial to the mounting of the fluid control valve, and the mounting is simple and the space required for the mounting is relatively reduced. In order to improve the strength of the adapter portions 11, the main valve body 10 is further provided with a connecting plate portion 12. At least part of the connecting plate part 12 is located between adjacent adapter portions 11, which improves the strength of the adapter portions 11 and can prevent the adapter portions 11 from being deformed and damaged.

Four adapter passages are shown in the drawings, and the number of the adapter passages is not limited to four. The number of the adapter passages may be more than or equal to two, or three, or five, or more than six. The height of each adapter portions 11 can be different, so as to be adapt to different positions of openings of the valve body portion. In this embodiment, in order to facilitate the mounting of the adapter ports 14 of the adapter portions 11, the adapter ports of the adapter portions 11 are located in a same plane.

Figure 6:
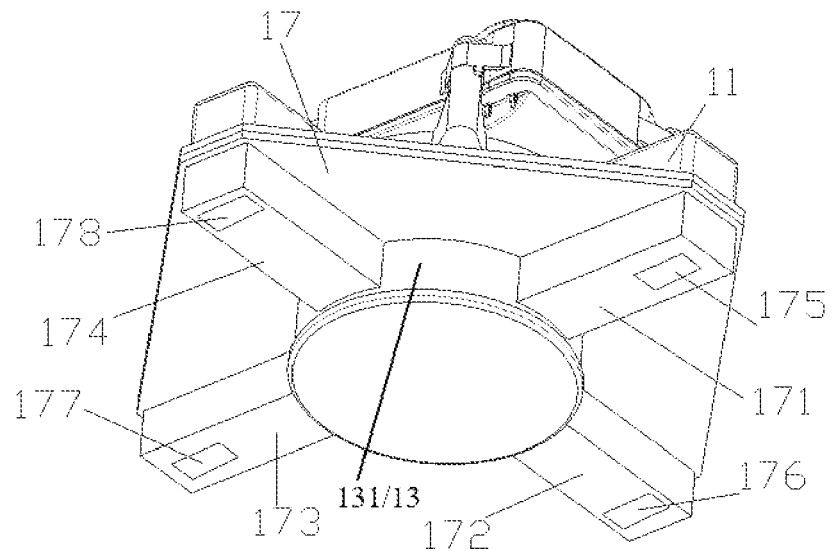
FIG. 6 is a schematic perspective view of the fluid control valve according to another embodiment.
Figure 7:
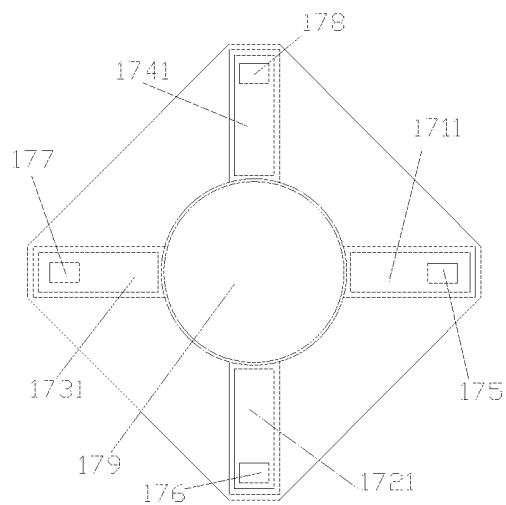
FIG. 7 is a schematic bottom view of the fluid control valve of the fluid control valve according to the embodiment shown in FIG. 6.

Another embodiment is shown in FIG. 6 and FIG. 7, in this embodiment, the main valve body 10 can be formed by integral injection molding. In order to facilitate of demoulding, the opening of the adapter port 14 of the adapter portion 11 is large, that is, the shape and size of the opening of the adapter port 14 need to meet demoulding requirements. In order to better adapt to the mounting of the fluid control valve, the fluid control valve further includes a lower end cover 17. The lower end cover 17 covers at least part of the adapter port 14, and the lower end cover 17 is sealingly connected with the adapter portions 11. The valve body portion 13 is provided with an extension portion 131 on a side opposite to the adapter portions 11, the middle of the lower end cover 17 is provided with a hole portion 179, the extension portion 131 is matched with the hole portion 179, at least part of the extension portion 131 extends into the hole portion 179, and the extension portion 131 is fixed to the hole portion 179. For example, in this embodiment, the extension portion 131 is fixed to the hole portion 179 by welding.

In order to reduce the fluid resistance of the fluid flowing through the adapter passages, the lower end cover 17 is provided with communication passages and ports which correspond to the adapter passages, so that the shape of the ports can be adjusted and adapted according to the requirements of mounting or use, and thus the mounting is simple. The various requirements can be met just by the modification to the lower end cover, and the applicability can be improved, which is suitable for standardized production, thus reducing costs.

In this embodiment, the lower end cover 17 is provided with a first communication passage 1711 corresponding to the first adapter passage 141, a second communication passage 1721 corresponding to the second adapter passage 142, a third communication passage 1731 corresponding to the third adapter passage 143, and a fourth communication passage 1741 corresponding to the fourth adapter passage 144. The lower end cover 17 is further provided with a first port 175 in communication with the first adapter passage 141, a second port 176 in communication with the second adapter passage 142, a third port 177 in communication with the third adapter passage 143, and a fourth port 178 in communication with the fourth adapter passage 144. Specially, the openings of the communication passages toward the adapter passage are directed to be opposite to the opening of each adapter passage. The positions of the ports of the lower end cover 17 can be adjusted as required, and are not limited to the positions shown in the drawings. In this embodiment, the ports are located on a same plane, which facilitates of mounting.

The lower end cover 17 is provided with protrusion portions which correspond to the adapter portions 11: a first protrusion portion 171, a second protrusion portion 172, a third protrusion portion 173, and a fourth protrusion portion 174. The protrusion portions are located on the side, opposite to the driving assembly 20, of the lower end cover 17, the communication passages are located in the protrusion portions, and each adapter portion 11 is fixed to the corresponding protrusion portion by welding or the adapter portions are fixed to the lower end cover by welding, so that the adapter passages are in communication with the communication passages. By providing the protrusion portion, materials can be saved.

Figure 8:
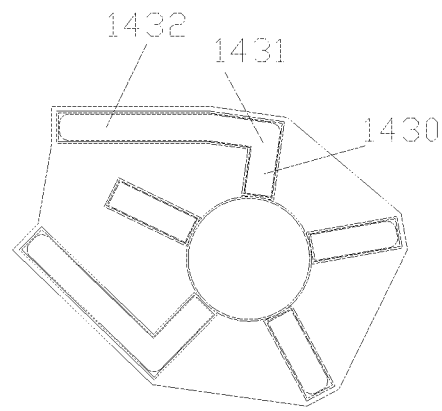
FIG. 8 is a schematic bottom view of a main valve body of the fluid control valve according to another embodiment.

Another embodiment is shown in FIG. 8. The structure of the fluid control valve provided by this embodiment is similar to the structure of the fluid control valve provided by FIG. 1 to FIG. 5, and the difference from the above embodiments is that, in this embodiment, at least one of the adapter passages is provided with a first passage, at least one bending portion and a second passage. For the sake of description, the third adapter passage 143 shown in FIG. 8 is described below. The third adapter passage 143 is provided with a first passage 1430, a bending portion 1431 and a second passage 1432. The first passage 1430 is in communication with the second passage 1432 through the bending portion 1431. Referring to FIG. 5 and FIG. 8, the first passage 1430 is in communication with the third connection port 134, and the second passage 1432 is in communication with the fourth adapter passage 144. By providing the bending portion 1431, an included angle is formed between the first passage 1430 and the second passage 1432, which ranges from 0° to 180°. For example, the included angle may be 0°, 30°, 60°, 90°, 120° or 180°. The various included angles between the first passage 1430 and the second passage 1432 enable the positions of the adapter ports to be adapted for more complicated positions, with simple structure and easy processing. It should be noted that multiple bending portions may also be provided in one adapter passage, and the number of the adapter passages with the bending portion may also be plural.

Figure 9:
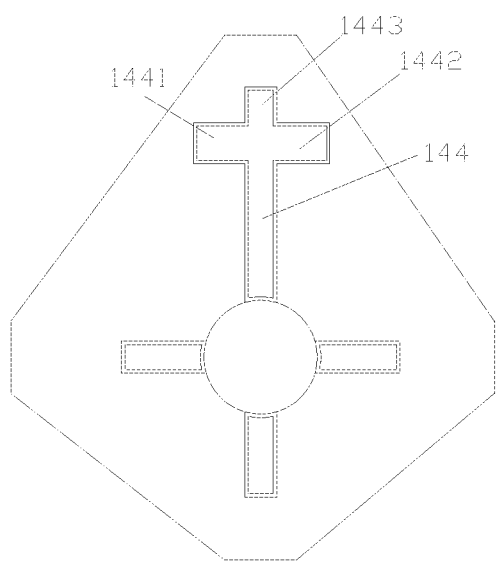
FIG. 9 is a schematic bottom view of the main valve body of the fluid control valve according to another embodiment.

Another embodiment is shown in FIG. 9. The structure of the fluid control valve provided by this embodiment is similar to the structure of the fluid control valve shown in FIG. 1 to FIG. 5, and the difference from the above embodiments is that, in this embodiment, at least one of the adapter passages is provided with at least two branch passages which are independent with each other, and the at least two branch passages in the same adapter passage are in communication with the same connection port. The fluid can flow independently in the branch passages. For the sake of description, the fourth adapter passage 144 shown in FIG. 9 is described below. The fourth adapter passage 144 is provided with a first branch passage 1441, a second branch passage 1442 and a third branch passage 1443, and each branch passage is in communication with a flow passage in a system. The branch passages in one adapter passage may be located on a side, opposite to the connection port, of the adapter passage, or located at other positions, which is not limited herein.

Figure 10:
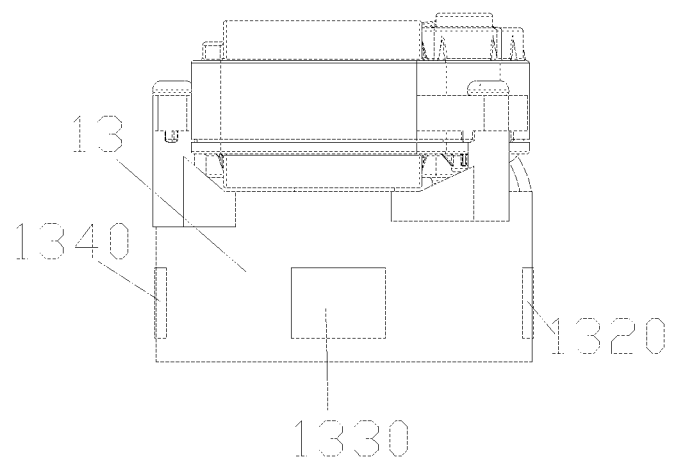
FIG. 10 is a schematic front view of the fluid control valve according to the another embodiment with an adapter component being removed.
Figure 11:
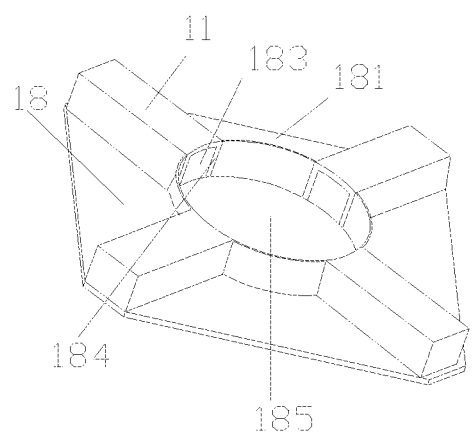
FIG. 11 is a schematic perspective view of the adapter component of the fluid control valve according to the embodiment shown in FIG. 10.

Another embodiment is shown in FIG. 10 and FIG. 11. The structure of the fluid control valve provided by this embodiment is similar to the structure of the fluid control valve shown in FIG. 1 to FIG. 5, and the difference from the above embodiments is that, in this embodiment, the adapter portions 11 and the valve body portion 13 are fixed into an integral structure by welding. As shown in the FIG. 10 and FIG. 11, multiple adapter portions 11 and connecting plate portion 12 are part of an adapter body 18 in an integral structure, the valve body portion 13 is provided with multiple through holes corresponding to the adapter portions 11, which are a first through hole 1320, a second through hole 1330, a third through hole 1340, and a fourth through hole. The fourth through hole and the second through hole 1330 can be located on two radially opposite sides of the valve body portion 13. The first connection port 132 is part of the first through hole 1320, the second connection port 133 is part of the second through hole 1330, the third connection port 134 is part of the third through hole 1340, and the fourth connection port 135 is part of the fourth through hole. The adapter body 18 is provided with an accommodating hole 185, multiple connecting holes 183 are defined on a wall portion of the accommodating hole 185, the adapter passages are in communication with the multiple through holes through the multiple connecting holes 185, and each adapter passage is in communication with at least one connecting hole 183. Part of the valve body portion 13 extends into the accommodating hole 185 and the valve body portion 13 is fixed to the wall portion of the accommodating hole 185 by welding and is sealed to the wall portion of the accommodating hole 185.

It should be noted that although the present disclosure has been described herein in detail with reference to the above embodiments, those of ordinary skill in the art should understand that those skilled in the art may still modify or equivalently replace the present disclosure, and all technical solutions and its improvements that do not apart from the spirit and scope of the present disclosure should be covered by the scope of the claims of the present disclosure.

The invention claimed is:

1. A fluid control valve, comprising a driving assembly, a valve core assembly and a main valve body, wherein the fluid control valve is provided with a valve chamber, at least part of the valve core assembly is located in the valve chamber, the valve core assembly is rotatable driven by the driving assembly, wherein the main valve body is provided with a valve body portion and at least two adapter portions, the valve body portion forms at least part of a wall portion of the valve chamber, each adapter portion extends outward from a side wall of the valve body portion, each adapter portion is provided with an adapter passage, each adapter portion is further provided with an adapter port corresponding to and in communication with the adapter passage, the valve body portion is provided with at least two connection ports, the at least two connection ports are located on different sides of the valve body portion, the adapter passage is in communication with at least one connection port; wherein the adapter ports of the at least two adapter portion are opened in a same direction opposite to the driving assembly and are located on a same plane, wherein each of the adapter ports is configured as an inlet or an outlet, and wherein the main valve body is further provided with a connecting plate portion, and at least part of the connecting plate portion is located between adjacent adapter portions.

2. The fluid control valve according to claim 1, wherein a sealing component is provided between the wall portion of the valve chamber and the valve core assembly, the valve core assembly is provided with at least one connection passage, the sealing component is provided with at least two communication holes, the at least two communication holes correspond to and are in communication with the at least two connection ports, and one connection passage is in communication with at least two communication holes, so that one adapter passage is in communication with the other adapter passage through one connection port, one communication hole, the connection passage, the other communication hole and the other connection port.

3. The fluid control valve according to claim 2, wherein the adapter ports are located on a same plane, the fluid control valve further comprises a lower end cover, and the lower end cover covers at least part of each adapter port, wherein the lower end cover is sealed to the at least two adapter portions.

4. The fluid control valve according to claim 2, wherein at least one of the adapter passages is provided with a first passage, at least one bending portion and a second passage, the first passage is in communication with the second passage through the bending portion, the first passage is in communication with the corresponding connection port, and an included angle a formed between the first passage and the second passage ranges from 0° to 180°.

5. The fluid control valve according to claim 2, wherein at least one of the adapter passages is provided with at least two branch passages that are independent with each other, and the at least two branch passages in the same adapter passage are in communication with the same connection port.

6. The fluid control valve according to claim 2, wherein the main valve body comprises an adapter body, the adapter body is provided with a plurality of adapter portions and the connecting plate portion, the plurality of adapter portions and the connecting plate portion are in an integral structure, and the adapter body is fixed to the valve body portion by welding.

7. The fluid control valve according to claim 1, wherein the fluid control valve further comprises a lower end cover, and the lower end cover covers at least part of each adapter port, wherein the lower end cover is sealed to the at least two adapter portions.

8. The fluid control valve according to claim 7, wherein the valve body portion is provided with an extension portion on a side opposite to the at least two adapter portions, the lower end cover is provided with a hole portion, the extension portion is matched with the hole portion, at least part of the extension portion extends into the hole portion, the extension portion is fixed to the hole portion by welding, and the lower end cover sealedly covers at least part of the adapter ports.

9. The fluid control valve according to claim 8, wherein the lower end cover is provided with protrusion portions corresponding to the communication passages, the protrusion portions are located on a side, opposite to the driving assembly, of the lower end cover, and each adapter portion is fixed to the corresponding protrusion portion by welding and is sealed to the corresponding protrusion portion.

10. The fluid control valve according to claim 8, wherein the lower end cover is provided with communication passages that correspond to the adapter passages, and the openings of the communication passages toward the adapter passage are directed to be opposite to the opening of each adapter passage.

11. The fluid control valve according to claim 10, wherein the lower end cover is further provided with ports which correspond to the communication passages, the ports are in communication with the communication passages, and each port is opened in a direction, opposite to the driving assembly, of the lower end cover.

12. The fluid control valve according to claim 10, wherein the lower end cover is provided with protrusion portions corresponding to the communication passages, the protrusion portions are located on a side, opposite to the driving assembly, of the lower end cover, and each adapter portion is fixed to the corresponding protrusion portion by welding and is sealed to the corresponding protrusion portion.

13. The fluid control valve according to claim 1, wherein at least one of the adapter passages is provided with a first passage, at least one bending portion and a second passage, the first passage is in communication with the second passage through the bending portion, the first passage is in communication with the corresponding connection port, and an included angle a formed between the first passage and the second passage ranges from 0° to 180°.

14. The fluid control valve according to claim 1, wherein at least one of the adapter passages is provided with at least two branch passages that are independent with each other, and the at least two branch passages in the same adapter passage are in communication with the same connection port.

15. The fluid control valve according to claim 1, wherein the main valve body comprises an adapter body, the adapter body is provided with a plurality of adapter portions and the connecting plate portion, the plurality of adapter portions and the connecting plate portion are in an integral structure, and the adapter body is fixed to the valve body portion by welding.

16. The fluid control valve according to claim 15, wherein the valve body portion is provided with a plurality of through holes corresponding to the plurality of adapter portions, the adapter body is provided with an accommodating hole, a plurality of connecting holes are provided in a wall portion of the accommodating hole, the adapter passages are in communication with the plurality of through holes through the plurality of connecting holes, each adapter passage is in communication with at least one connecting hole, and part of the valve body portion extends into the accommodating hole and the valve body portion is sealed to the adapter body.

17. The fluid control valve according to claim 16, wherein the valve body portion is fixed to the wall portion of the accommodating hole by welding.

18. A fluid control valve, comprising a driving assembly, a valve core assembly and a main valve body, wherein the fluid control valve is provided with a valve chamber, at least part of the valve core assembly is located in the valve chamber, the valve core assembly is rotatable driven by the driving assembly, wherein the main valve body is provided with a valve body portion and at least two adapter portions, the valve body portion forms at least part of a wall portion of the valve chamber, each adapter portion extends outward from a side wall of the valve body portion, each adapter portion is provided with an adapter passage, each adapter portion is further provided with an adapter port corresponding to and in communication with the adapter passage, the valve body portion is provided with at least two connection ports, the adapter passage is in communication with at least one connection port; wherein the adapter ports of the at least two adapter portion are opened in a same direction opposite to the driving assembly, wherein the fluid control valve further comprises a lower end cover, and the lower end cover covers at least part of each adapter port, wherein the lower end cover is sealed to the at least two adapter portions, wherein the lower end cover is provided with communication passages that correspond to the adapter passages, and the lower end cover is further provided with ports which correspond to the communication passages, the ports are in communication with the communication passages, and each port is opened in a direction, opposite to the driving assembly, of the lower end cover.

19. A fluid control valve, comprising a driving assembly, a valve core assembly and a main valve body, wherein the fluid control valve is provided with a valve chamber, at least part of the valve core assembly is located in the valve chamber, the valve core assembly is rotatable driven by the driving assembly, wherein the main valve body is provided with a valve body portion and at least two adapter portions, the valve body portion forms at least part of a wall portion of the valve chamber, each adapter portion extends outward from a side wall of the valve body portion, each adapter portion is provided with an adapter passage, each adapter portion is further provided with an adapter port corresponding to and in communication with the adapter passage, the valve body portion is provided with at least two connection ports, the adapter passage is in communication with at least one connection port; wherein the adapter ports of the at least two adapter portion are opened in a same direction opposite to the driving assembly, and the main valve body comprises an adapter body, the adapter body is provided with a plurality of adapter portions and a connecting plate portion, the plurality of adapter portions and the connecting plate portion are in an integral structure, and the adapter body is fixed to the valve body portion.

* * * * *